June 17, 1952    R. J. HARTZ    2,600,763
SPEED GOVERNOR
Filed Aug. 28, 1951
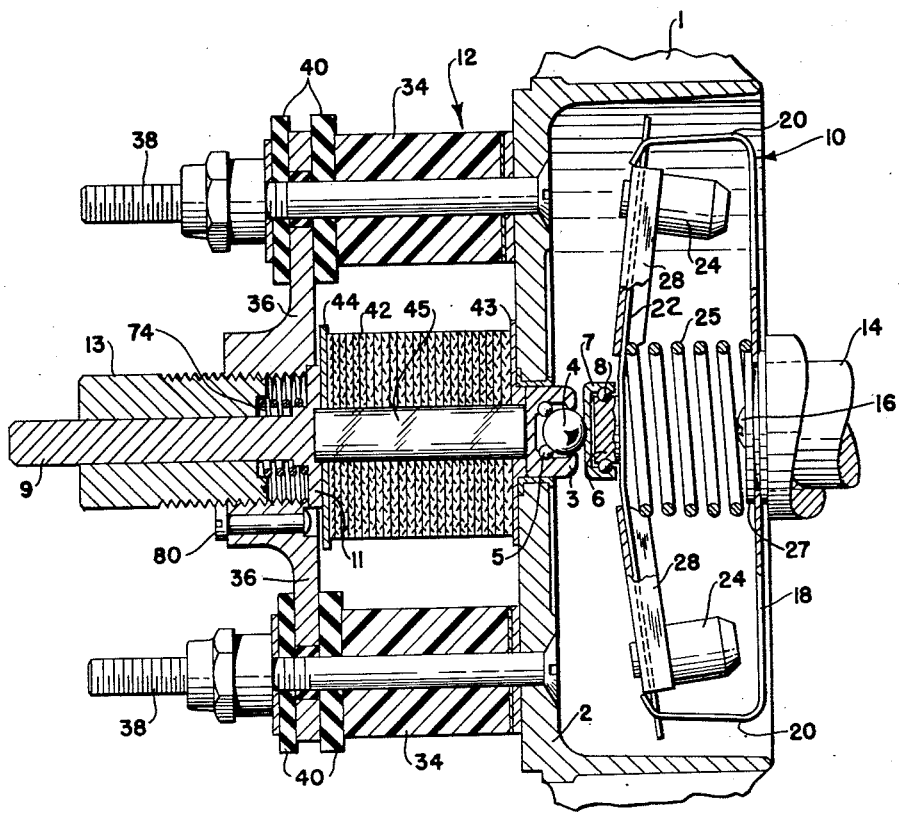
INVENTOR.
RAYMOND J. HARTZ
BY
Frank H Harmon
ATTORNEY Patented June 17, 1952

2,600,763

UNITED STATES PATENT OFFICE 2,600,763

SPEED GOVERNOR

Raymond J. Hartz, Cuyahoga Falls, Ohio, assignor to Jack & Heintz, Inc., Cleveland, Ohio, a corporation of Delaware Application August 28, 1951, Serial No. 243,977

4 Claims. (Cl. 201—48)

This invention relates in general to speed governors and more particularly to centrifugal governors for electrical machines employing pressure responsive carbon pile resistors.

The conventional arrangement in such speed governors, is to employ a rotary unit, including a compression coil spring and a bowed spring carrying centrifugal weights, and a stationary unit including a carbon pile resistor carried by the frame of the electrical machine. It is further conventional to non-rotatively mount a ball in the bowed spring, which under the pressure of the compression coil spring, seats in a socket in a thrust bearing block to normally exert a compressive force on the carbon pile. In actual operation, such an arrangement has been found to be highly unsatisfactory due to the high degree of wear on the ball and the socket, resulting in the application of compressive force by the compression coil spring in planes other than the true longitudinal plane of the carbon pile. This results in the tilting, or cocking, of the carbon pile discs, causing ununiform air gaps therebetween so as to render the carbon pile unsatisfactory for its intended purpose.

It is therefore one of the primary objects of my invention to provide such a construction wherein both the ball and the thrust bearing block are rotatively mounted to avoid wear and misalignment.

Another object is to provide such a construction wherein the rotatably mounted ball is carried by the thrust bearing block to rotatably engage the flat surface of a member rotatably carried by the centrifugal rotary unit to avoid wear and misalignment.

A further object is to provide a convenient and efficient manual means accessible from the exterior for initially adjusting the compression of the carbon pile discs.

With the foregoing and other objects in view, the invention resides in the combination of parts and in the details of construction hereinafter set forth in the following specification and appended claims, certain embodiments thereof being illustrated in the accompanying drawing, which is a fragmentary longitudinal sectional view of the speed governor constituting one form of my invention.

The invention may be applied to any electrical machine in which the speed may be varied by a variation in electrical resistance. It is shown in the drawing as comprising a rotary unit, generally indicated at 10 and connected to the shaft of the electrical machine, and a stationary unit, generally shown at 12, and mounted in fixed position to the end plate 2 of the machine housing 1.

The rotary unit includes a stud 14 secured to the machine shaft by a screw bolt 16. Secured to the stud 14 is a flexible frame 18 with resilient side arms 20 arranged to receive the ends of a flat spring 22, to which are riveted centrifugal weights 24. A compression coil spring 25 bears between the base of the rotary unit and the center of spring 22 to bow that latter, as shown in the drawing. Spring 25 is centered by a cylindrical boss 27 on the rotary frame. Wing members 28 are secured to spring 22 by the same rivets used to secure centrifugal weights 24. Suitably secured to the center of spring 22 is a stud 6 that is provided with a circumferential groove to receive a series of ball bearings 8 to support a race 7 that has a smooth flat front surface.

The stationary unit includes posts 34 supported between stationary frame walls 2 and 36 by bolts 38, with insulating washers 40 on each side of wall 36.

A carbon pile 42 made of a series of thin annular discs is mounted between walls 2 and 36. At its ends the carbon pile engages floating contacts 43 and 44. An insulating supporting tube passes through the central holes of the discs and the corresponding holes in members 43 and 44. With the discs are assembled on tube 45, the end flange 11 of member 9 is forced to the right by compression coil spring 74 to compress the discs by engagement of flange 11 with floating contact 44. This spring 74, besides surrounding stem 9, is under compression between flange 11 and the inner end of a screw plug 13 that may be screwed in and out of end wall 36. Thus, a manual turning of plug 13 affords a simple externally accessible means for initially adjusting the compression of the carbon pile discs, which compressive force is resiliently applied through spring 74.

Slidably mounted in wall 2 is a ball retainer 3 that carries a larger ball 4 rotatably mounted therein and supported by a series of small ball bearings 5 so as to permit free rotation of ball 4 against the flat surface of race 7 that is freely rotatably carried by to form part of the rotary unit.

The initial compression of the discs is adjusted by plug 13 and the latter is locked in position by suitable locking means 80. When the shaft of the electrical machine is idle, or running at slow speed, the flat spring 22 remains bowed, as shown in the drawings, due to the expansive force of spring 25. This, together with the action of spring 14, maintains the carbon pile discs under the maximum compression with minimum air gaps and minimum electrical resistance in the carbon pile between the floating contacts.

The spring forces of the rotary unit are made up of the forces due to the resilient arms 20, the flexure of flat spring 22 and the force of coil spring 25. Wing members 28 are used to flex flat spring 22 and compress coil spring 25 and to prevent buckling of flat spring 22.

The rotary unit is preferably so adjusted that it assumes the position shown in the drawing with the flat spring 22 bowed when the shaft of the electrical machine is at rest. Upon attainment of a predetermined speed of shaft rotation the centrifugal force set up in weights 24 sufficiently opposed the force of spring 25 to partially straighten out flat spring 22 and relieve the compression of the carbon pile discs to increase the electrical resistance and thus automatically regulate the shaft speed.

By means of the virtually frictionless engagement of the rotatably mounted ball 4 and the flat surfaced rotatably mounted race 7, wear is virtually eliminated. Moreover even if the thrust of spring 25 should be applied out of plane with the longitudinal plane of the carbon pile, there is no ultimate compressive force applied to the carbon pile discs that would tend to cock, or tilt them. This is by reason of ball 4 being able to engage and ride on any part of the flat surface of race 7 and the ball retainer being longitudinally slidable in the frame wall 2.

I claim:

1. A centrifugal governor, a frame, said governor comprising a stationary unit, including a pressure responsive carbon disc pile resistor, end supports for said pile, an expansive stationary spring acting on said pile to compress the same, manual means external of said governor, and at one end of said carbon pile, for adjusting the expansive force of said stationary spring for initially adjusting the spacing of said discs, a ball retainer slidably mounted in said frame at the opposite end of said carbon pile, a ball member rotatably supported by ball bearings in said ball retainer to have a portion of said ball member protruding out of its retainer, said rotary unit comprising a flexible frame and a flat spring carried thereby, said flat spring carrying a flat surface rotatably mounted ball bearing race, said flat spring also carrying centrifugally responsive weights, a compression coil spring mounted to bow said flat spring and force said race into flat surface pressure engagement with the ball member of said stationary unit.

2. A centrifugal governor, a frame, said governor comprising a stationary unit, including a pressure responsive carbon disc pile resistor, end supports for said pile, an expansive stationary spring acting on said pile to compress the same, a retainer mounted in said frame at the opposite end of said carbon pile, a member rotatably supported by said retainer, said rotary unit comprising a flexible frame carrying a flat surface rotatably mounted member and centrifugally responsive weights, spring means mounted to bow said flexible frame and force said flat surface member into pressure engagement with the rotatable member of said stationary unit.

3. A centrifugal governor, a frame, said governor comprising a stationary unit, including a pressure responsive carbon disc pile resistor, end supports for said pile, an expansive stationary spring acting on said pile to compress the same, a ball retainer slidably mounted in said frame at the opposite end of said carbon pile, a ball member rotatably supported by ball bearings in said ball retainer to have a portion of said ball member protruding out of its retainer, said rotary unit comprising a flexible frame and a flat spring carried thereby, said flat spring carrying a flat surface rotatably mounted ball bearing race, said flat spring also carrying centrifugally responsive weights, a compression coil spring mounted to bow said flat spring and force said race into flat surface pressure engagement with the ball member of said stationary unit.

4. A centrifugal governor, a frame, said governor comprising a stationary unit, including a pressure responsive carbon disc pile resistor, end supports for said pile, an expansive stationary spring acting on said pile to compress the same, manual means external of said governor, and at one end of said carbon pile for adjusting the expansive forces of said stationary spring for initially adjusting the spacing of said discs, a ball retainer slidably mounted in said frame at the opposite end of said carbon pile, a member rotatably supported by said retainer, said rotary unit comprising a flexible frame carrying a flat surface rotatably mounted member centrifugally responsive weights, spring means mounted to bow said flexible frame and force said flat surface member into pressure engagement with the rotatable member of said stationary unit.

RAYMOND J. HARTZ.

No references cited.